Nov. 8, 1966 F. JAMNIK 3,284,182
DEVICE FOR THE FABRICATION OF U-SHAPED PROFILES
OF GLASS IN A CONTINUOUS ROLLING PROCEDURE
Original Filed June 22, 1961 2 Sheets-Sheet 1

Inventor:
Fridolin Jamnik
by Michael S. Striker
Attorney

Nov. 8, 1966     F. JAMNIK     3,284,182
DEVICE FOR THE FABRICATION OF U-SHAPED PROFILES
OF GLASS IN A CONTINUOUS ROLLING PROCEDURE
Original Filed June 22, 1961     2 Sheets-Sheet 2

Inventor
Fridolin Jamnik
by Michael S. Striker
Attorney

United States Patent Office 3,284,182
Patented Nov. 8, 1966

1

3,284,182
DEVICE FOR THE FABRICATION OF U-SHAPED PROFILES OF GLASS IN A CONTINUOUS ROLLING PROCEDURE
Fridolin Jamnik, Vienna, Austria, assignor to Moosbrunner Glasfabriks-Aktiengesellschaft, Vienna, Austria
Original application June 22, 1961, Ser. No. 118,904, now Patent No. 3,226,219, dated Dec. 28, 1965. Divided and this application Oct. 21, 1965, Ser. No. 499,577
Claims priority, application Austria, June 14, 1961, A 4,624/61
The portion of the term of the patent subsequent to Dec. 23, 1982, has been disclaimed
3 Claims. (Cl. 65—170)

The present application is a division of my copending application, Serial No. 118,904, filed on June 22, 1961 and entitled "Device for the Fabrication of Reinforced and/or Not Reinforced U-Shaped Profiles of Glass in a Continuous Rolling Procedure," now U.S. Patent Serial No. 3,226,219.

The present invention relates to an apparatus for the manufacture of vitreous products. More specifically, it relates to an apparatus of the above-mentioned type for the continuous manufacture of vitreous products. Still more specifically, the present invention relates to an apparatus for the manufacture of vitreous products which reliably determines the width of the continuous ribbon of molten vitreous material from which such products are manufactured, and which at the same time serves to give the borders of such ribbon a desired profile.

More and more glass products are finding use in structural applications, particularly in architectural use, and of these, products with a U-shaped profile have the greatest applicability. In my above-mentionel co-pending application I have set forth how such U-profiled glass products can be continuously manufactured. However, it is not only necessary to give these products the sought-after U-shaped profile, but it is also necessary that the strip of molten vitreous material, from which such U-profiled products are manufactured, have a constant width since otherwise the respective legs of the U would be of different height. Also, it is essential that the free marginal portions of these legs be perfectly straight since they must often abut against other surfaces. Finally, it is frequently necessary that the free marginal portions of the legs of the U-shaped product have themselves a given profile or configuration so as to conform to the specifications of the architect.

It is known, and in fact described in my above-mentioned patent, to equalize the thickness of the molten material from which the U-profiled products will later be manufactured, by disposing a pair of vertically superimposed rollers downstream of a source of molten material so that, when such material issues from this source it will pass through a gap which is formed by spacing the two rollers in vertical direction from one another. Of course, this gap is open at its opposite ends, that is transversely of the direction of travel of the molten material. In order, now, to control exactly the width of the strip of material which results from passage of molten material through this gap, it is necessary to prevent escape of the molten material through the open ends of the gap. Various attempts have been made to achieve this. For example, it is known to provide various members which close the open ends of the gap, members which are secured to the end face of one of the rollers and frictionally engage the end face of the other roller, or members which extend intermediate the respective rollers parallel to the axes thereof, and project into the gap. However, all of the solutions known to me from the prior art have the drawback that they are either im-

2 possible, or at least very difficult to cool and that they provide only inadequate protection against escape of molten material through the open ends of the gap, so that such material can interpose itself between the end faces of the respective rollers and whatever sealing means is provided. The lack of cooling and the inadequate sealing, however, inevitably lead to adhesion of the glass to both the sealing means and the end faces of the rollers and results, as the mass of material moves through and beyond the gap defined by the rollers, in damage to the surface of the peripheral portion of the band of vitreous material which is formed in the gap. This makes proper abutting of the edge faces of the band against planar surfaces difficult or impossible. Also, the band naturally varies in its width as some of the material manages to escape beyond the ends of the gap, and furthermore it has been found that the load-carrying ability of glass products, particularly of U-profiled products, is substantially reduced if the surface of the glass is damaged and particularly if it is damaged along marginal portions of the product. This latter, in particular, also precludes the possibility of correcting the marginal portions of the band of the finished product to eliminate variations in width or to eliminate roughness of the edge face, since this of course would result in surface damage and consequent reduction in the load-carrying ability of the product.

It is therefore a general object of the present invention to overcome the above-mentioned drawbacks.

A more specific object of the present invention is to provide an apparatus which will prevent escape of the mass of molten vitreous material through the open ends of the gap formed between the vertically superimposed draw-in rollers.

Still more specific object of the invention is to provide an apparatus as mentioned above which will substantially eliminate variations in the width of the band of vitreous material from which a finished product is to be manufactured.

Yet a further object is to provide an apparatus as described above which will form the marginal portions of such band in a desired shape and without damage to the surface of the band.

In accordance with these objects, one feature of my invention consists in the provision of an apparatus for the manufacture of vitreous products which comprises an equalizing means defining an elongated open-ended gap, and a feed or source of molten vitreous material located upstream of the equalizing means so that a mass of molten material may continuously be fed into the gap from one side thereof. This assures that the material passes through the equalizing means and will emerge from the other side of the gap as a continuous band. Finally, the apparatus also comprises a sealing means which seals the ends of the open-ended gap and thereby determines the width of the band.

The novel features which are considered as characteristic for the invention are set forth in particular in the appended claims. The invention itself, however, both as to its construction and its method of operation, together with additional objects and advantages thereof, will be best understood from the following description of specific embodiments when read in conection with the accompanying drawings, in which:

Figure 1:
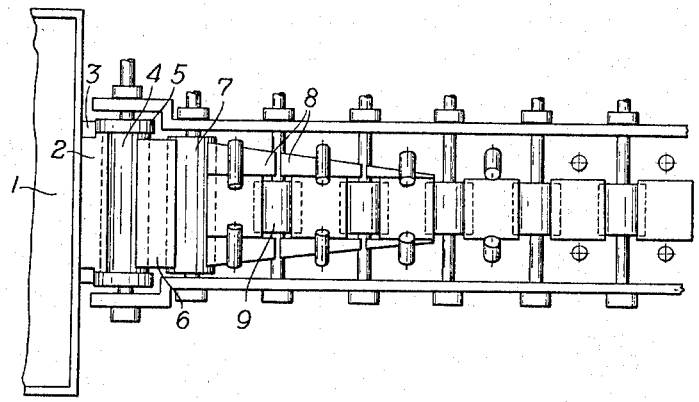
FIG. 1 is a top plan view of a device for the manufacture of U-profiles from vitreous material, and incorporates an embodiment of my invention.

Turning now to a more detailed discussion of the figures, and firstly to FIG. 1, it is to be noted that this figure is a general view of a machine for manufacturing U-shaped profiles from molten vitreous material. The machine, which incorporates my invention, is shown here to provide a proper background so as to promote better understanding of the invention. Reference numeral 1 of FIG. 1 designates a source of molten vitreous material which latter flows through an opening (not shown) onto a supporting surface 2. Escape of the liquid material in lateral direction of the supporting surface 2 is prevented by laterally slidable closure members 3. From supporting surface 2 the material then passes between a pair of vertically superposed draw-in rollers 4, 4' which serve to equalize the thickness of the material and which form the material into a band. This band then passes via a bridge-support 6, arranged downstream of the rollers 4, 4', and via a supporting roller 7 to supporting plates 8 where it is engaged by transport rollers 9 and advanced through the machine for further processing, for example into a U-profiled product. Respective sealing means 5 seal the lateral openings of the gap between the draw-in rollers 4, 4' and prevent escape of the molten material in lateral direction as it passes through this equalizing gap.

Figure 2:
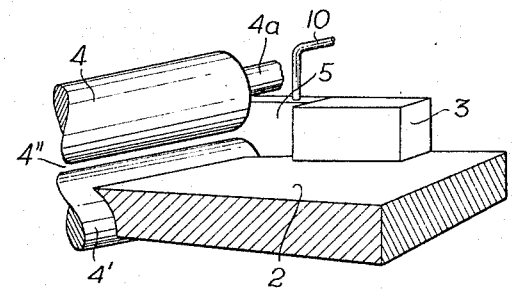
FIG. 2 is a perspective view, partly sectioned, of an embodiment of the invention.
Figure 3:
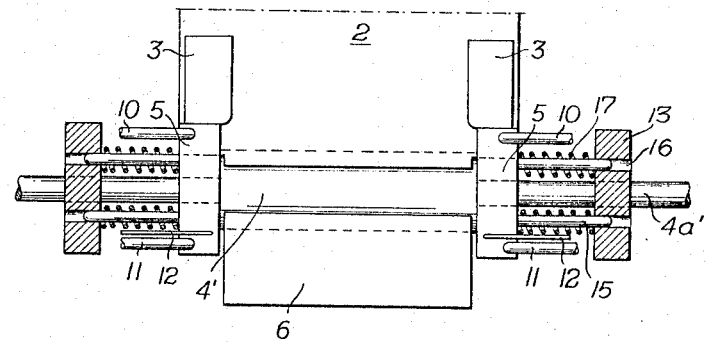
FIG. 3 is a top plan view, partly sectioned, of the embodiment of FIGURE 2, with the uppermost one of the draw-in rollers, which constitute the equalizing means, removed for clarity of illustration.

Turning now to FIG. 2 it will become more evident how the inventive arrangement operates. The supporting surface 2 will be seen to extend to the immediate vicinity of the gap 4'' which is defined between the vertically superposed draw-in rollers 4, 4'. Laterally slidable closure members 3 prevent, it has been pointed out before, escape of the molten material in lateral direction of the support surface 2. Immediately adjacent the closure members 3 on the downstream side thereof there are provided the sealing means 5 which in the present illustration will be seen to be blocks consisting preferably of a metallic material. As is evident from FIG. 3 the blocks 5 are provided on their sides which face away from the rollers 4, 4' with respective projections 15 whose outer free ends are received in bores or recesses 16 provided in respective support means 13 which are each laterally spaced from the rollers 4, 4' and whose primary function is to support the respective shafts 4a and 4a' about which the rollers 4, 4' rotate. Spring means, in the drawing shown as helical springs 17, surround the projections 15 and engage with their opposite ends the respective outwardly directed faces of the blocks 5 on the one hand, and the respective inwardly directed faces on the support means 13 on the other, thereby biasing the blocks 5 against the lateral end faces of the rollers 4, 4'. Of course, it would be possible to bias only one of the blocks 5, and to have the other perform its sealing function in a different manner; this would depend on the particular characteristics required of the band of vitreous material and of the final product.

Figure 4:
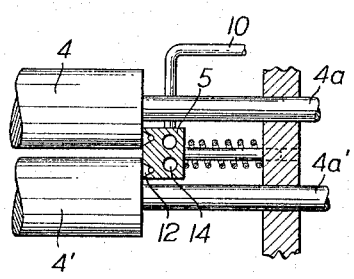
FIG. 4 is a detail view of FIGURE 2, partly sectioned.
Figure 5:
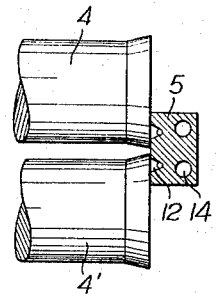
FIG. 5 is a detail view of a modified embodiment of the draw-in rollers which constitute the equalizing means.

As seen in FIGURES 2, 4 and 5 the blocks 5 are formed with channels 14 which respectively communicate with inflow conduit 10 and an outflow conduit 11 so that a heat-regulating fluid may be circulated through the channels 14. Obviously, the conduit 10 would have to be connected with a source of such fluid, but it is not believed necessary to show or describe such source since this is a well-known expedient. Since it is generally desired to cool the sealing blocks 5 so as to prevent adhesion of the molten vitreous material to the blocks, the fluid passing through the channels 14 will usually be a cooling medium. Since cooling prevents adhesion of the mass of vitreous material to the sealing blocks 5, the material will simply slide along the inwardly directed faces of the blocks, and the surface of the material will not be damaged by initial adhesions and subsequent tearing loose.

As has been pointed out before, and as is evident from the drawing, the sealing blocks 5 are spring-biased against the end faces of the rollers 4, 4'. Such biasing must on the one hand not be so strong as to prevent turning of the rollers, and on the other hand must be strong enough to provide a completely reliable seal against escape of liquid material. Naturally, the result is considerable friction between the inwardly directed faces of the blocks 5 and the end faces of the rollers 4, 4'. To overcome or at least mitigate such friction it is necessary that the end faces of the rollers and the inwardly directed faces of the blocks 5, as far as they engage the end faces of the rollers, be lubricated. To this end the inwardly directed faces of the blocks 5 are respectively provided with open grooves 12 which are closed at their ends and which communicate with suitable conduit means (not shown) through which lubricant may be supplied to the grooves 12 from a source of lubricant (also not shown) with which the conduit means is connected. It should be noted that the grooves 12 are provided in the inwardly directed faces of the sealing blocks 5 in such a manner that the lubricant can only come in contact with the outwardly directed end face of the rollers 4, 4' and will not contact the mass of molten vitreous material. Since the sealing blocks 5 are constantly biased against the end faces of the rollers 4, 4', the grooves 12 in effect define with these end faces closed chambers, so that lubricant will not flow from these chambers into the gap 4'' and thereby get into contact with the molten vitreous material. This arrangement provides a constant, adequate lubrication between the inwardly directed faces of blocks 5 and the outwardly directed faces of the rollers 4, 4', and impermissibly high friction is thus avoided.

Figure 6:
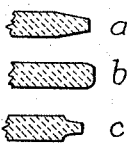
FIG. 6 illustrates by way of example several marginal configurations obtainable with my inventive apparatus.

It has been pointed out earlier that it may be necessary or desirable, depending upon specifications for the final product to provide the marginal portions of the band with specific profiles. This can be achieved as shown in FIGURE 5, by providing the marginal portions of the draw-in rollers immediately inwardly of the end faces thereof with a suitable profile which will impart a complementary profile to the band of molten material as it passes through the gap 4''. By way of example there are shown in FIG. 6 three different possible marginal configurations for the band of molten material, respectively designated a, b and c. The configuration shown in FIG. 6a is obtained with the embodiment of FIG. 5, whereas the configuration of FIG. 6b is obtained with the embodiment of FIG. 4. It will be obvious from the configuration shown in FIG. 6c that other profiles are possible and can be readily achieved by providing the draw-in rollers 4, 4' with portions of suitable profiles and that, if desired, additional profiled portions may be provided on inwardly directed faces of the sealing blocks 5.

It will be understood that each of the elements described above, or two or more together, may also find a useful application in other types of apparatus for the manufacture of vitreous products differing from the type described above.

While the invention has been illustrated and described as embodied in an apparatus for the manufacture of vitreous products, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for the manufacture of vitreous products, comprising
    equalizing means, including a pair of rotatable superposed parallel rollers spaced from one another so as to define an elongated gap having open ends, said rollers each having respective opposite end faces adjacent said open ends;
    a source of molten vitreous material located upstream of said equalizing means for continuously feeding a mass of molten material into said gap from one side so that said material emerges from the other side of said gap as a continuous band;
    sealing means sealing said open ends of said gap, said sealing means comprising a pair of blocks having respective faces engaging said end faces of said rollers, said faces of said blocks being provided with open recesses in contact with said end faces of said rollers and said blocks being formed rearwardly of said recesses with bores;
    heat-exchanger means cooperating with said bores of said blocks for regulating the temperature thereof; and lubricating means for introducing lubricant into said recesses of said block faces of said blocks intermediate said end faces of said rollers and said sealing means for reducing friction therebetween.

2. An apparatus as defined in claim 1, further comprising support means laterally spaced from said end faces of said rollers, said rollers being rotatably supported by said support means, and wherein said blocks each have an additional face facing the respective support means, said additional face of each block being provided with a projection projecting into engagement with the respective support means; and biasing means for each of said blocks and including spring means surrounding said projection and bearing on said additional face and said support means for biasing said block against the end face of the respective roller.

3. An apparatus as defined in claim 2 wherein the respective support means is provided with a bore, and wherein a respective free end portion of each of said projections is received in the respective bore whereby said blocks are secured against movement from their respective predetermined positions.

No references cited.

DONALL H. SYLVESTER, *Primary Examiner.*

A. D. KELLOGG, *Assistant Examiner.*